No. 622,202. Patented Apr. 4, 1899.
C. A. BRINK.
HOOK GUARD.
(Application filed Oct. 29, 1898.)

(No Model.)

Witnesses
E. H. Boyden
E. B. Read

Inventor:
Carl A. Brink.
By Arnold + Barlow
Attorneys.

UNITED STATES PATENT OFFICE.

CARL A. BRINK, OF PROVIDENCE, RHODE ISLAND.

HOOK-GUARD.

SPECIFICATION forming part of Letters Patent No. 622,202, dated April 4, 1899.

Application filed October 29, 1898. Serial No. 694,929. (No model.)

*To all whom it may concern:*

Be it known that I, CARL A. BRINK, of Providence, in the county of Providence and State of Rhode Island, have invented certain new and useful Improvements in Hook-Guards; and I do hereby declare that the following is a full, clear, and exact description thereof, reference being had to the accompanying drawings, and to the letters of reference marked thereon, which form a part of this specification.

This invention relates to the hooks used to secure the covers of boxes and for other like purposes.

It is fully explained and illustrated in this specification and the accompanying drawings.

Figure 1:
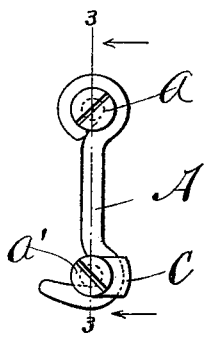
Figure 2:
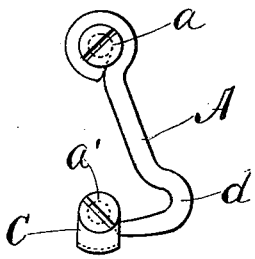
Figure 3:
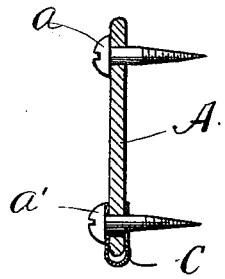
Figure 4:
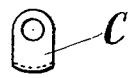
Figure 5:
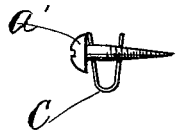

Figure 1 represents a front elevation of the hook and its guard, the latter being in position to prevent the release of the hook. Fig. 2 represents the same parts as Fig. 1 with the guard turned down and the hook partly released. Fig. 3 is a vertical section of Fig. 1 on line 3 3 in that figure. Fig. 4 shows a front view of the guard separate. Fig. 5 is a side or edge view of the guard-loop and the screw the hook catches on.

The object of this invention is to fasten the hook when caught, so that it will not be released by any motion or strain resulting from carrying a case or box by the handle attached to the cover when the cover is secured by a hook.

The construction and operation of the hook-guard are as follows:

A is a hook of common form, which in case of its application to a box is usually secured to the cover or case by means of a round-headed wood-screw $a$, that passes through a hole at one end of the shank of the hook A, and a like screw $a'$, which is screwed into the other part of the box from screw $a$ for the hook to catch on when the cover is fastened.

The guard C is shown separately in Figs. 4 and 5. It is made of a piece of sheet metal bent up into a spring-loop, (see Fig. 5,) and a hole $c$ is made in each side of the loop to receive the screw $a'$, on which the hook A catches in fastening the box. The distance between the back of the loop and the hole $c$ is just sufficient to allow the loop to pass easily around the bend $d$ of the hook when the hook is engaged with the screw $a'$. The loop C is not closed in the making, but the sides are left flaring, so that when the screw $a'$ is inserted in it the screw will compress the sides of the loop and create a friction on it that will prevent it from turning too easily.

In using the guard the hook A is caught on the neck of the screw $a'$ between the sides of the guard C, which is then in the position shown in Fig. 2. The loop-guard is then turned up in the position seen in Fig. 1 and holds the hook in engagement with the screw until turned down again.

This makes a hook-guard that is easily manipulated, but that can be depended upon to stay where it is put, and that will not wear loose by using. It can readily be applied to hooks already in use and can be made at a mere nominal cost for stock and labor.

Having thus described my improvements, I claim as my invention and desire to secure by Letters Patent—

The combination of a hook and a spring-loop made of sheet metal having its two sides made divergent and having holes in them to receive the screw the hook catches on, substantially as described.

In testimony whereof I have hereunto set my hand this 26th day of October, A. D. 1898.

CARL A. BRINK.

In presence of—
BENJ. ARNOLD,
E. H. BOYDEN.